United States Patent [19]

Magara et al.

[11] Patent Number: 5,177,334
[45] Date of Patent: Jan. 5, 1993

[54] WIRE CUT ELECTRIC DISCHARGE MACHINING APPARATUS

[75] Inventors: Takuji Magara; Yoshio Shibata; Masahiro Yamamoto; Kazuo Tsurumoto, all of Aichi, Japan

[73] Assignee: Mitsubishi Denki K.K., Tokyo, Japan

[21] Appl. No.: 755,225

[22] Filed: Sep. 5, 1991

[30] Foreign Application Priority Data

Sep. 17, 1990 [JP] Japan .................................. 2-246767
Sep. 18, 1990 [JP] Japan .................................. 2-248381

[51] Int. Cl.[5] ............................................. B23H 7/10
[52] U.S. Cl. ............................................... 219/69.12
[58] Field of Search ...................................... 219/69.12

[56] References Cited

U.S. PATENT DOCUMENTS

| | | | |
|---|---|---|---|
| 4,484,052 | 11/1984 | Inoue ................................ | 219/69.12 |
| 5,015,814 | 5/1991 | Morishita ......................... | 219/69.12 |
| 5,029,246 | 7/1991 | Suzuki et al. .................... | 219/69.12 |
| 5,041,708 | 8/1991 | Wehrli .............................. | 219/69.12 |

FOREIGN PATENT DOCUMENTS

| | | | |
|---|---|---|---|
| 60-44230 | 3/1985 | Japan ................................ | 219/69.12 |
| 61-86131 | 5/1986 | Japan ................................ | 219/69.12 |
| 61-164727 | 7/1986 | Japan ................................ | 219/69.12 |
| 2-279216 | 11/1990 | Japan ................................ | 219/69.12 |

Primary Examiner—Geoffrey S. Evans
Attorney, Agent, or Firm—Sughrue, Mion Zinn Macpeak & Seas

[57] ABSTRACT

A wire cut electric discharge machining apparatus capable of machining a workpiece with a machining solution to produce a work having a desired shape. The work is magnetically attracted to be held and conveyed to a desired position by one of a pair of nozzles through which the machining solution is supplied to an interelectrode gap between the workpiece and a wire-shaped electrode. Since the attraction condition is controlled to be maintained unchanged, it is possible to move and convey the work and the like to the desired position with high accuracy and safety.

19 Claims, 10 Drawing Sheets

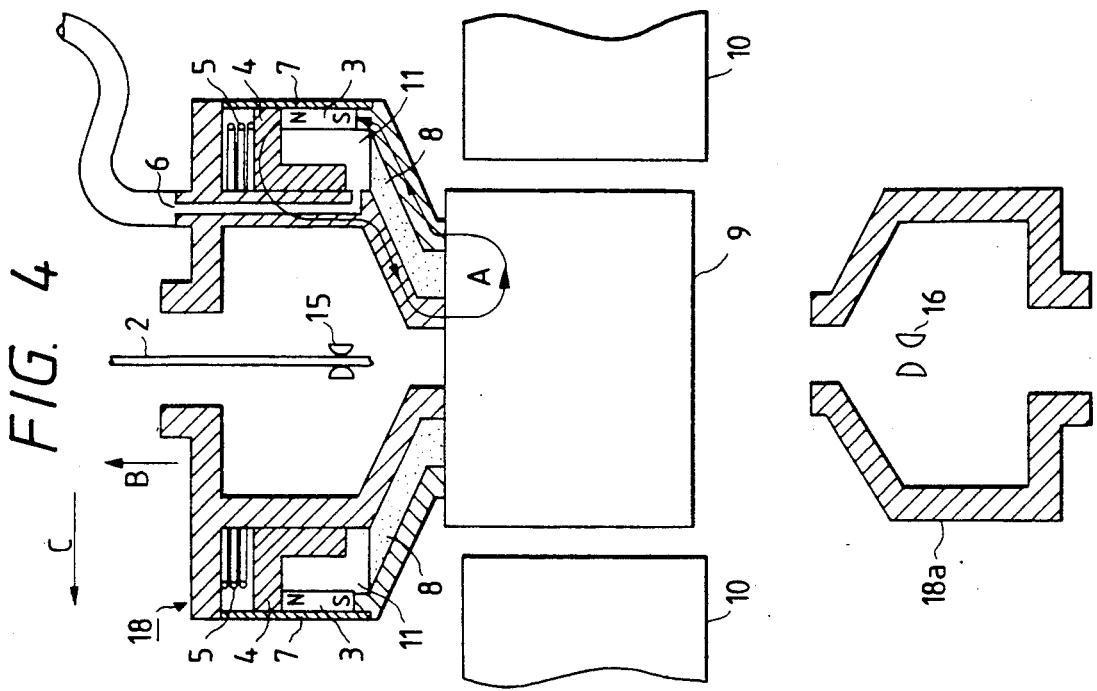
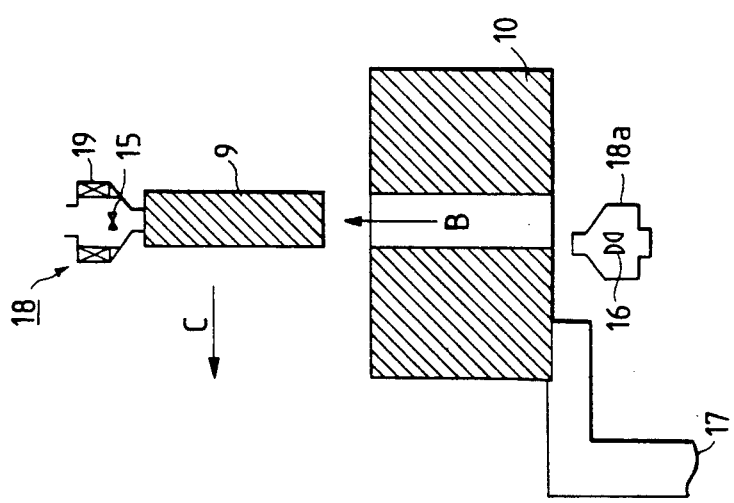

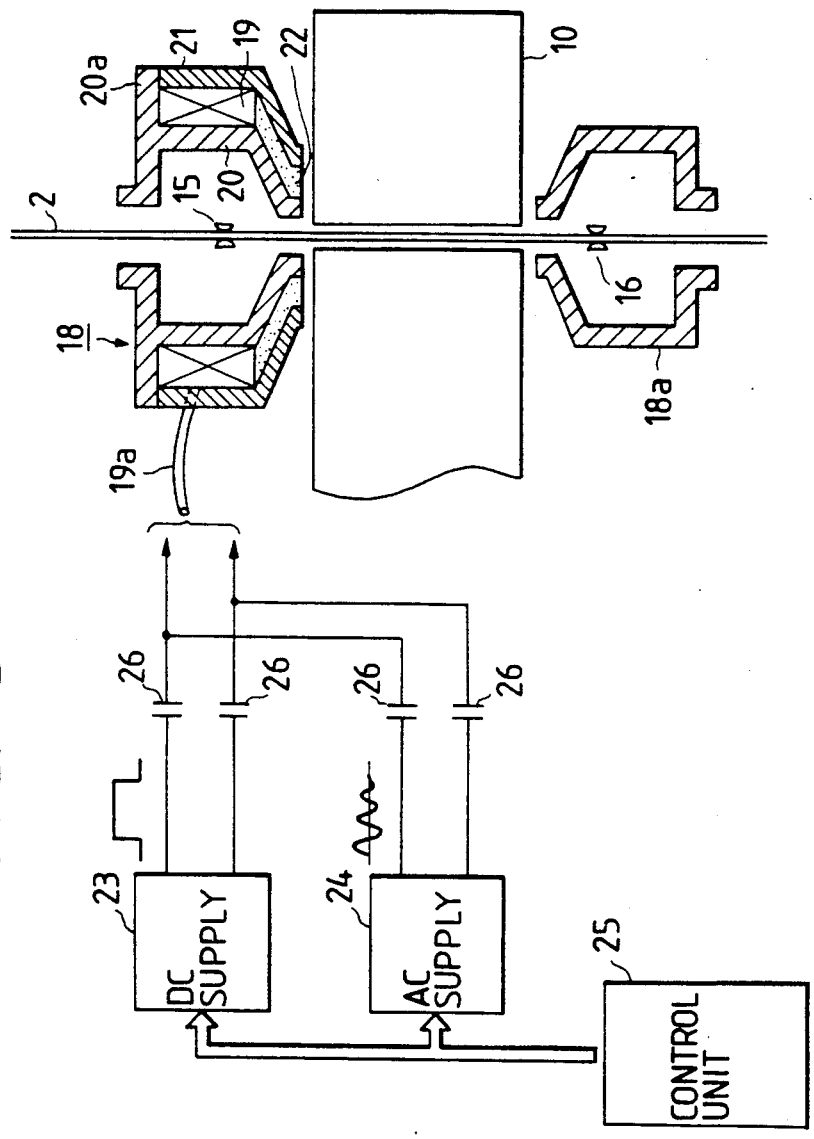

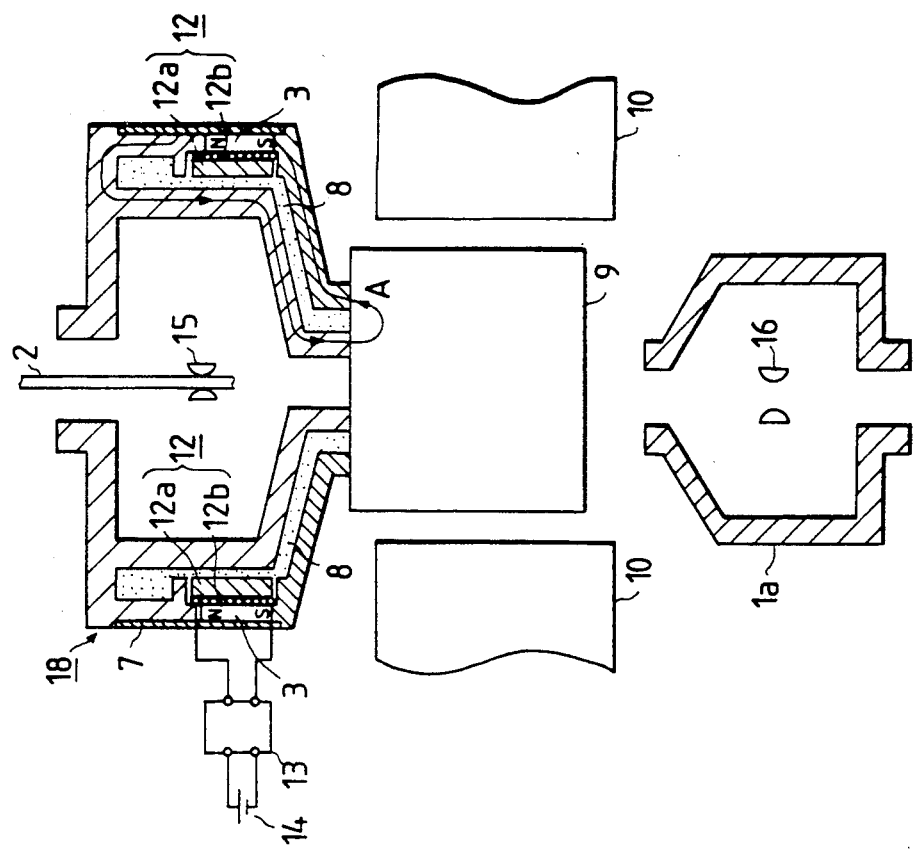
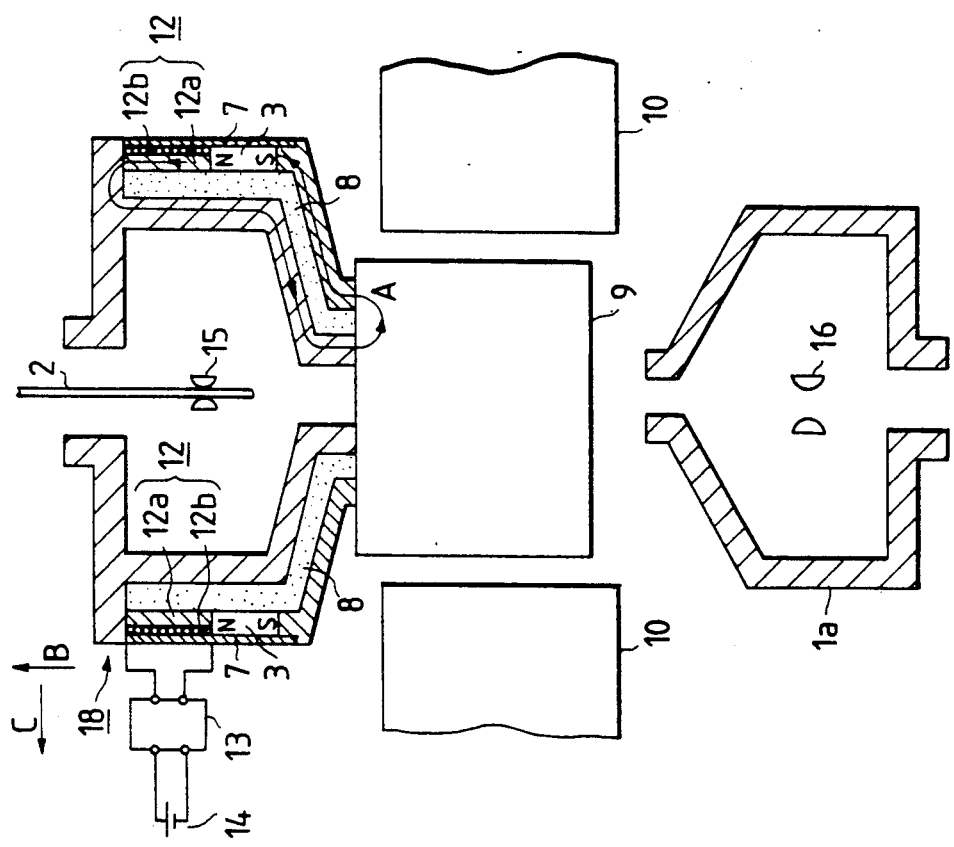

WIRE CUT ELECTRIC DISCHARGE MACHINING APPARATUS

BACKGROUND OF THE INVENTION

The present invention relates to a wire cut electric discharge machining apparatus and, more particularly to a device for use in such a wire cut electric discharge machining apparatus for conveying and treating a workpiece, a work or a work scrap cut off from the basic material.

FIG. 1 is a schematic diagram showing a structural view partly in section of an example of a conventional wire cut electric discharge machining apparatus. In this figure, reference numeral 2 designates a wire electrode, and 18 stands for an upper machining solution injection nozzle which is formed of a magnetic material having a dual structure in the diametrical direction thereof. The nozzle 18 includes an electromagnetic coil 19 incorporated into the dual-structure magnetic material coaxially with the wire electrode 2 so as to provide an integral structure. The machining solution injection nozzle 18 (a magnet nozzle) formed of a magnetic material serves as an electromagnet and is thus able to attract and convey a workpiece 10, and a work scrap or a work 9 cut off from the workpiece 10 (see FIG. 3), which is referred simply to as the "work 9" hereinafter when applicable.

More specifically, as shown in FIG. 1. the upper machining solution injection nozzle 18 comprises cylindrically shaped inside yoke 20 having a flange 20a in the upper end thereof and forming an inside ring-shaped magnetic circuit, a cylindrically shaped outside yoke 21 disposed outside of the inside yoke 20 with the upper end thereof in contact with the inner surface of the flange 20a, forming an annular gap between the inside yoke 20 itself and forming an outside ring-shaped magnetic circuit, an electromagnetic coil 19 having a lead wire 19a incorporated integrally into the annular gap between the inside and outside yokes 20 and 21, and a seal member of insulating resin filled in the lower opening in the annular gap to prevent the machining solution entering into the annular gap where the electromagnetic coil 19 is accommodated. Also, the upper machining solution injection nozzle 18 is connected directly to a Z shaft (not shown) and can be moved in a vertical direction.

The inside yoke 20 and outside yoke 21 are made of an iron material having a high magnetic permeability, or a stainless steel material for prevention of rust, or may be made of an iron material on the surface of which anti-rust (rust preventive) plating is then applied. Further, in order to prevent electrolytic corrosion during wire electrical discharge machining, the yokes are wholly or in partly coated with an insulating material. As the insulating coating, either synthetic resin or high wear-proof ceramic coating is generally used.

In FIG. 1, reference numeral 15 designates an upper positioning guide of the wire electrode 2; 16, a lower positioning guide of the wire electrode 2; 17, a stand for carrying the workpiece thereon; and 18a, a lower machining solution injection nozzle.

Now, FIGS. 2 and 3 are explanatory diagrams for the description about the operation of the wire cut electric discharge machining apparatus as shown in FIG. 1.

Next, the operation of the conventional apparatus as shown in FIG. 1 will be described with reference to FIGS. 2 and 3. In FIG. 2, when the wire electrode 2 is removed after the work 9 is machined and detached completely from the workpiece 10, the electromagnetic coil 19 is excited so that a magnetic circuit is constituted by the inside yoke 20, the outside yoke 21 and the work 9. In this case, a magnetic flux is allowed to flow in a direction of an arrow A shown by a broken line in FIG. 2, whereby the work 9 or work scrap can be attracted by the upper machining solution injection nozzle 18 made of a magnetic material.

Then, the work 9, which is attracted by the magnetic force of the upper machining solution injection nozzle 18 as shown in FIG. 3, is taken out in an upward direction (in a direction of an arrow B) from the workpiece 10. Thereafter, the work 9 is conveyed in a horizontal direction (in a direction of an arrow C), and is carried outside of the machining range. The transportation of the work 9 in the upper and horizontal directions is automatically carried out for means by servo controlling the X, Y and Z shafts.

Next, when trying to start afresh the machining of the work 9, after the wire electrode 2 is inserted through the upper and lower machining solution injection nozzles 18 and 18a by use of a wire electrode automatic insertion device (not shown), the upper machining solution injection nozzle 18 is returned to a predetermined height position by means of the Z shaft control, the machining of the work 9 having an arbitrary shape is resumed by means of the X-shaft and Y-shaft control.

Referring now to FIG. 4, there is shown a schematic structural view, partly in section, of another example of the conventional wire cut electric discharge machining apparatus. In FIG. 4, reference numeral 18 also designates an upper machining solution injection nozzle which is made of a magnetic material having a dual structure in the diameter direction thereof. And, the following components are integrally incorporated as one within the dual-structure magnetic material: that is, a ring-shaped permanent magnet 3 disposed concentrically with the wire electrode 2; a ring-shaped movable member 4 made of a magnetic material and movable in a vertical direction; a press spring 5 for biasing the movable member 4 against the permanent magnet 3; an injection port 6 through which an oil, an air or the like for detaching the movable member 4 from the permanent magnet 3 is injected; a case 7 made of a non-magnetic material, and a sealing member 8 formed of a non-magnetic material for filling up a gap in an air pocket (space) 11 formed by the dual-structure magnetic material. The thus constructed upper machining solution injection nozzle 1 is then connected directly to a Z shaft (not shown) in such a manner that it is movable in a vertical direction.

Also, an example of the magnetic material forming the upper machining solution injection nozzle 18 is an iron material having a high magnetic permeability or a stainless steel material for rust prevention, an iron material on the surface of which anti-rust plating may be then applied. Further, in order to prevent electrolytic corrosion during wire electric machining, the upper machining solution injection nozzle 18 is whole or partly coated with an insulating material. As the insulating coating, generally, a synthetic resin coating or a highly wear proof ceramic coating is used.

In FIG. 4, the other portions or members which are common to those in FIGS. 1 to 3 bear the same or corresponding reference numerals in FIGS. 1 to 3.

The operation of the conventional wire cut electric discharge machining apparatus as shown in FIG. 4 will be described hereinafter. In FIG. 4, as is similar to the operation of the above described conventional apparatus, when the wire electrode 2 is removed after the work 9 has been machined and is then detached completely from the workpiece 10, the air present in the air pocket 11 within the magnetic material forming the machining solution injection nozzle 1 is discharged. Thereafter, if the machining solution injection nozzle 18 is caused to approach the work 9 with the movable member 4 in contact with the permanent magnet 3, a magnetic flux flows in a direction of an arrow A shown in FIG. 9 through a magnetic circuit formed by the machining solution injection nozzle 18, permanent magnet 3 and work 9, so that the work 9 can be attracted by the magnetic force of the machining solution injection nozzle 18. The work 9 attracted by the magnetic force of the machining solution injection nozzle 18 in this manner, after taken out in an upward direction, that is, in a direction of arrow B shown in FIG. 4, is conveyed in a horizontal direction, that is, in a direction of arrow C shown in FIG. 4. Then, the work 9 is carried outside of the machining range. The transportation of the work 9 in the upward direction (B direction) and in the horizontal direction (C direction) is automatically carried out by means of servo controlling the X, Y and Z shafts.

After the work 9 is carried to a predetermined position outside of the machining range, the air is injected through the injection port 6 into the air pocket 11 to detach the movable member 4 from the permanent magnet 3 to thereby expand the magnetic gap within the magnetic circuit and thus reduce the magnetic flux which passes through the work 9 being attracted. That is, the work 9 can be dropped from the machining solution injection nozzle 19 at the time when the weight of the work 9 exceeds the magnetic force for attracting the work 9. The following machining operation will be carried out in the same manner as described in the above described conventional apparatus.

With such a conventional wire cut electric discharge machining apparatus shown in FIG. 1, as the upper machining solution injection nozzle 18 is attracting the work 9 to lift the same, the amount of heat generated due to the current flowing through the electromagnetic coil 19 is increased thereby resulting in deteriorating the machining accuracy of the work 9. This has been a problem to be solved in the conventional wire cut electric discharge machining apparatus. Also, when a power failure occurs while the work or work scrap is being attracted to be removed form the workpiece 10, then the magnetic force of the magnetic material forming the machining solution injection nozzle 18 is extinguished abruptly to thereby cause the work or work scrap to fall down resulting in an occurrence of damage in the work 9, which may be the surface of a table (not shown) or the like. Further, there may occur the same damage to the work 9 and the like due to the fact that the work 9 or the work scrap is incompletely attracted or held by the nozzle 18.

In view of this problem, in order to prevent such drop of the work or work scrap, it has been proposed to employ an optical sensor capable of detecting the attraction condition externally during the operation of attracting the work or work scrap. In this case, however, it is disadvantageous in that it is difficult to detect the attraction of small-size work scraps and since the position where the detection should be carried out is changeable, it is troublesome to fix or limit the detection position.

Further, in the conventional apparatus, it is difficult to detect the attraction condition with accuracy, to detect the drop of the work 9 and the like from the nozzle 18 during conveying thereof, and to detect the delivery of the work 9 and the like into a work collecting box (not shown). This may result in making it impossible to continue further machining operation.

With another conventional wire electric discharge machining apparatus as shown in FIG. 4, a movable mechanism which includes a movable member capable of being moved by oil, air or the like must be held within the magnetic material forming the machining solution injection nozzle, resulting in the complicated structure. In such structure, there are possibilities that undesired substances such as sludges contained in the oil, air or the like, water and the like may be mixed and thus a periodic maintenance is necessary to remove such undesired substances. Also, due to the provision of the movable mechanism including the movable member, it is very difficult to reduce the size of the machining solution injection nozzle.

SUMMARY OF THE INVENTION

An object of the present invention is to eliminate the drawbacks accompanying the above-mentioned conventional wire cut electric discharge machining apparatuses. More specifically, it is an object of the present invention to provide a wire cut electric discharge machining apparatus which can keep a constant magnetic force generated by the attracting portion of a magnetic material forming a machining solution injection nozzle to thereby lift and remove a work and a work scrap in a stable manner, as to provide an apparatus that can prevent occurrence of obstacles such as deterioration of the machining accuracy of the work.

It is another object of the invention to provide a wire cut electric discharge machining apparatus which can both realize a maintenance-free and compact structure by eliminating the movable mechanism having the movable member from the machining solution injection nozzle, and also can attract and remove a work and a work scrap stably without dropping them even when a power failure occurs while the work is being attracted by the machining solution injection nozzle formed of a magnetic material.

It is further an object of the invention to provide a wire cut electric discharge machining apparatus capable of detecting the attraction or collision condition of a work and the like in the nozzle portion thereof.

In order to attain the above objects, according to the invention, there is provided a wire cut electric discharge machining apparatus in which a workpiece is machined by an electric discharge which is generated in a gap between said workpiece and a wire-shaped electrode with a machining solution, comprising a pair of nozzles for supplying a machining solution to said machining gap, an electromagnetic coil which is integrally provided to the magnetic nozzle, a power supply unit for supplying a DC power to the electromagnetic coil to magnetize at least a part of the nozzle to attract at least a part of the workpiece, and a control unit for controlling the supply of the DC power to the electromagnetic coil. One of the nozzles is made of a magnetic member having a high residual magnetic flux density, and the part of workpiece which is obtained by electric discharge machining is attracted to the nozzle by a residual magnet force after the interruption of the DC power supply. The power supply unit includes an AC power supply to supply an AC current to the electromagnetic coil to demagnetize the magnetized part of the nozzle to thereby release the part of said workpiece.

One of the nozzles may be made of a magnetic material, and the magnetic nozzle is provided with a permanent magnet in such a manner that the permanent magnet is arranged so as to have a magnetic circuit in common with the electromagnetic coil, and the control unit may control the power supply unit to change the flowing direction of a DC current so as to cancel the magnetic flux of the permanent magnet to release the attracted workpiece.

The apparatus according to the present invention may be further provided with an impedance detecting unit for detecting variation in the impedance of the electromagnetic coil so as to observe the attraction condition or the state of the attracted workpiece or work.

BRIEF DESCRIPTION OF THE DRAWINGS

In the accompanying drawings:

FIGS. 2 and 3 are explanatory diagrams for the operation of the conventional wire cut electric discharge machining apparatus as shown in FIG. 1;

FIG. 4 is a schematic diagram showing a structural view partly in section of another example of a conventional wire cut electric discharge machining apparatus;

FIG. 5 is a schematic diagram showing a structural view partly in section of a first embodiment of a wire cut electric discharge machining apparatus according to the present invention;

FIG. 8 is a schematic diagram showing a structural view partly in section of a second embodiment of a wire cut electric discharge machining apparatus according to the invention;

FIG. 9 is a schematic diagram showing a structural view partly in section of a third embodiment of a wire cut electric discharge machining apparatus according to the invention;

DESCRIPTION OF THE PREFERRED EMBODIMENTS

Figure 2:
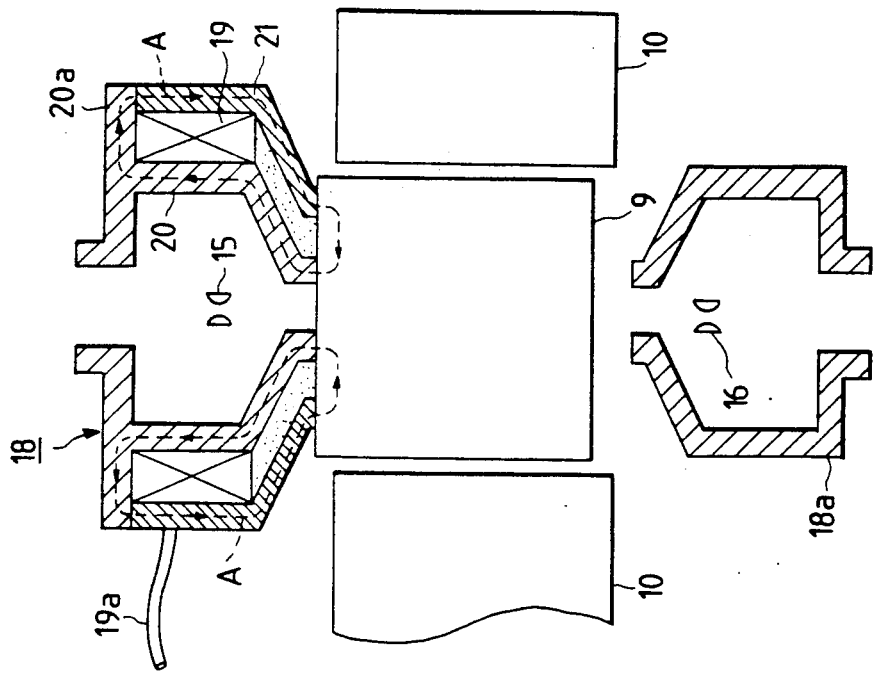
Figure 1:
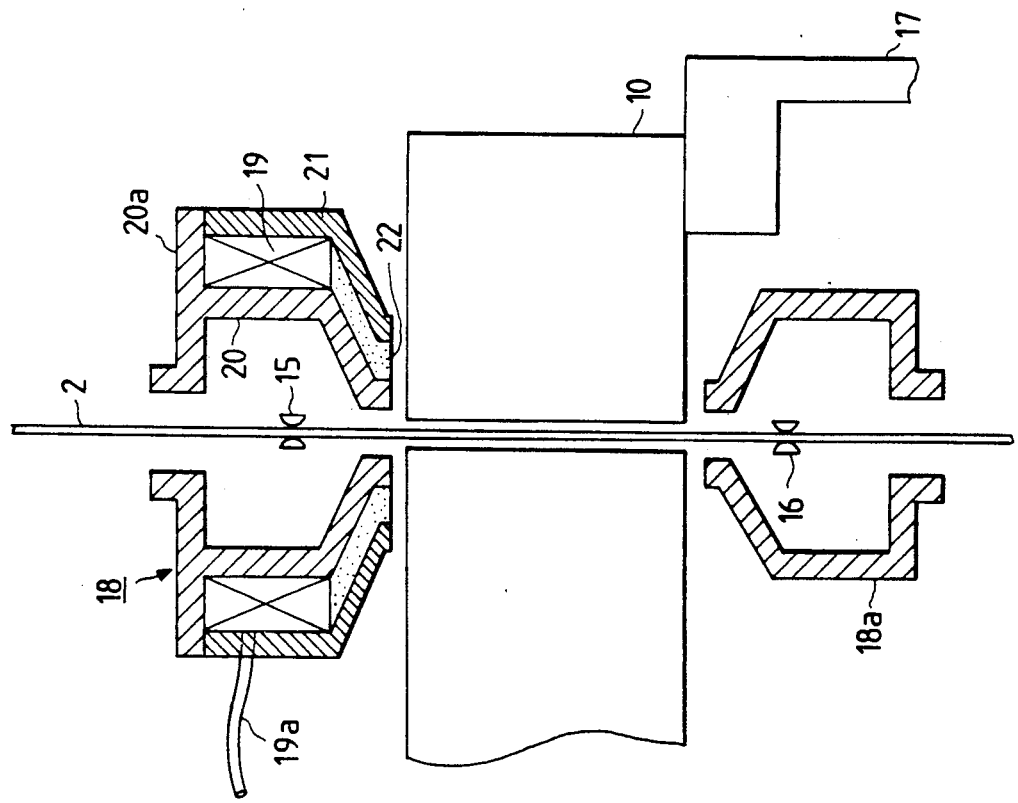
FIG. 1 is a schematic diagram showing a structural view partly in section of an example of a conventional wire cut electric discharge machining apparatus.

FIG. 5 is a schematic diagram showing a structural view partly in section of a first embodiment of a wire cut electric discharge machining apparatus according to the present invention, in which the same reference numerals as in FIG. 1 designate the same or similar parts through the two figures, thus the detailed description thereof is omitted herein. In FIG. 5, reference numeral 23 designates a DC power supply for supplying a direct current to magnetize the electromagnetic coil 19; 24, an AC power supply for supplying an alternating current to demagnetize the electromagnetic coil 19; 25, a control unit, and 26, a relay.

Figure 6:
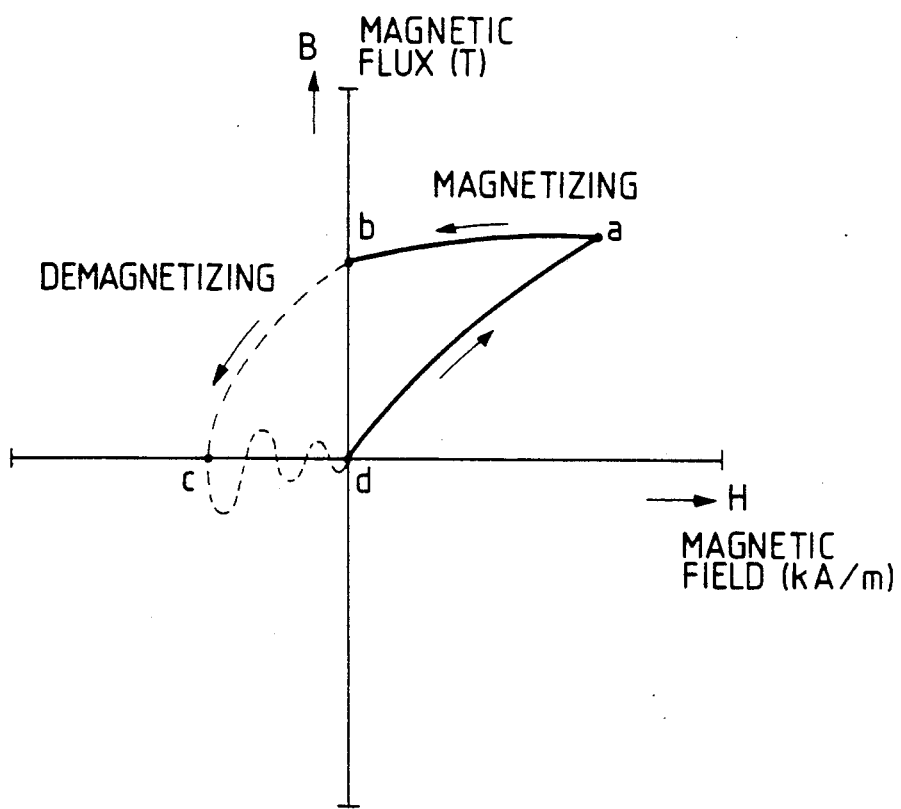
FIG. 6 is an explanatory diagram for the description about the H-B characteristic of a magnetic material forming a nozzle in the wire cut electric discharge machining apparatus as shown in FIG. 5.
Figure 7:
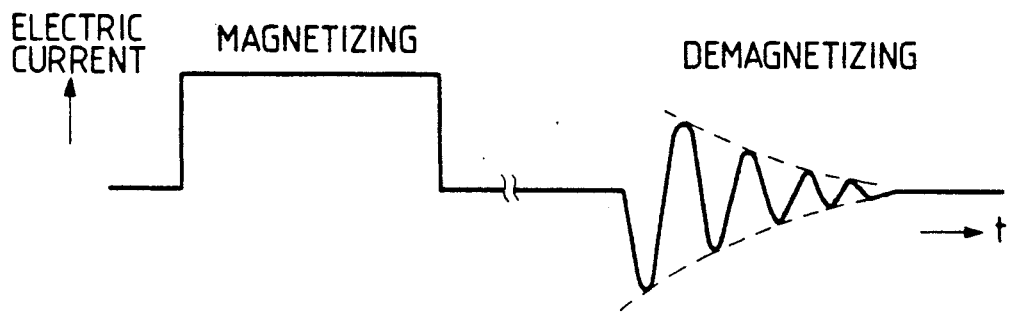
FIG. 7 is an explanatory diagram for the description about the waveform of an electric current to be supplied to a coil in order to magnetize or demagnetize the magnetic material in the wire cut electric discharge machining apparatus as shown in FIG. 5.

In FIG. 6 which is an explanatory diagram for the description of the Magnetic Field (H)-Magnetic Flux (B) characteristic of a magnetic material for the nozzle employed in the wire electric discharge machine shown in FIG. 5. FIG. 7 is an explanatory diagram showing the waveform of a current to be supplied to the electromagnetic coil 19 when magnetizing or demagnetizing the magnetic material in the nozzle 18 of the wire cut electric discharge machining apparatus shown in FIG. 5.

The operation of the first embodiment of a wire cut electric discharge machining apparatus which is shown in FIG. 5 will be described.

As is similar to the conventional apparatus, when the wire electrode 2 is removed from the upper and lower nozzles 18 and 18a after the workpiece 10 has been machined to obtain the work 9 and the work 9 is disconnected completely from the workpiece 10, the DC supply 23 is turned on to excite the electromagnetic coil 19, so that a magnetic circuit is formed by an inside yoke 20, outside yoke 21 and work 9 and a magnetic flux flows in a direction of arrow A shown by a broken line in FIG. 1. As a result, the work 9 is attracted by the upper machining solution injection nozzle 18. Because the inside and outside yokes 20 and 21 are respectively made of a magnetic material having a high residual magnetic flux density, even if the exciting current is turned off after the electromagnetic coil 19 is excited for several seconds, the magnetic force of the magnetic material can be maintained semipermanently. In FIG. 6, there is shown the H-B characteristic obtained when an Alnico material is used as the above-mentioned magnetic material. In this case, even if the exciting electric current to the electromagnetic coil 19 is turned off after it is once turned on, a magnetic flux level shown at a point a in FIG. 6 is substantially unchanged. The magnetic flux level is maintained at a point b in FIG. 6, so that a magnetic force can be kept unchanged in the magnetic material. For this reason, regardless of the supply of power, the work 9 or the work scrap attracted by the magnetic force can be treated similarly as in the above-mentioned conventional wire cut electric discharge machining apparatus shown in FIG. 8. Accordingly, the work 9 can be taken out from the workpiece 10 in an upper direction (in a direction of an arrow B) and after then it can be conveyed in a horizontal direction (in a direction of an arrow C) and delivered outside of the machining range.

Next, the control unit 25 operates to switch the power source to the AC power supply 24 which in turn supplies an alternating current to the electromagnetic coil 19 so as to demagnetize the magnetic material. Here, in FIG. 7, there is shown a waveform of the current that is supplied to the electromagnetic coil 19 when the magnetic material is magnetized or demagnetized. The magnetic material is demagnetized by the application of the output of the alternating current from the AC power supply 24 which is attenuated gradually as shown in FIG. 7. Therefore, the work 9 or work scrap can be delivered and released at a predetermined position from the machining solution injection nozzle 18 during such an attenuation period of time. This attenuation period is indicated ,by a dotted line from the point b to a point d through a point c (FIG. 6). In that attenuation period, according to the H-B characteristic of the magnetic material shown in FIG. 6, the residual magnetic flux of the magnetic material is removed.

FIG. 8 is a schematic diagram showing a structural view partly in section of a second embodiment of a wire cut electric discharge machining apparatus according to the invention, in which the same reference characters as in FIG. 4 designate the same or similar parts through the two figures and the detailed description thereof is omitted herein. In FIG. 8, reference numeral 12 designates a ring-shaped electromagnet. The electromagnet 12 includes a core 12a formed of a magnetic material and a coil 12b wound round the surface of the core 12a. The electromagnet 12 and a permanent magnet 13 are arranged in series within the machining solution injection nozzle 18 and they are also arranged in such a manner that the respective magnetic flux thereof have a magnetic circuit in common with each other. And, reference numeral 13 designates an electric circuit which is used to control the direction and intensity of an electric current flowing through the coil 12b of the electromagnet 12, and 14 stands for a power supply for the electromagnet 12.

The operation of the second embodiment, which is shown in FIG. 8, will be described. In FIG. 8, it is not until the machining of the workpiece 10 to obtain the work 9 has been completed that the electromagnet 12 is excited to produce the magnetic flux so as to cancel the magnetic flux generated by the permanent magnet 3 substantially. And, when the wire electrode 2 is taken out after the work 9 is completely detached from the workpiece 10, the electric circuit 13 is actuated either to reduce the amount of an electric current flowing through the coil 12b of the electromagnet 12 or to reverse the flowing direction of the current, so that the magnetic flux by the electric current now joins the magnetic flux by the permanent magnet 3, so that the work 9 can be attracted by the working solution injection nozzle 18. Thereafter, the work 9 attracted by the magnetic force of the machining solution injection nozzle 18 is lifted in an upward direction B and the conveyed in a horizontal direction outside of the machining range. After the work 9 is carried out to a predetermined position from the machining range, the electronic circuit 13 operates either to increase the amount of the current or to reverse the flowing direction of current again so that the magnetic flux thereof can cancel the magnetic flux by the permanent magnet 3 thereby reducing the magnetic flux passing by the work 9 attracted by the magnetic force of the machining solution injection nozzle 18 to release the work 9. Then, at the time when the weight of the work 9 exceeds the attracting force of the injection nozzle, the work 9 can be released from the machining solution injection nozzle 1. In other words, the attraction of the work 9 to the machining solution injection nozzle 1 or the detachment of the work 9 from the machining solution injection nozzle 1 can be achieved by controlling the direction and intensity of the electric current flowing through the coil 12b of the electromagnet 12, that is, the attraction or detachment of the work 9 with respect to the machining solution injection nozzle 1 can be carried out by electrically changing or controlling the magnetic force continuously and with high accuracy.

Next, when starting to machine a new workpiece 10 to obtain another work 9, similarly as in the above-mentioned conventional wire cut electric discharge machining apparatus shown in FIG. 4, after the wire electrode 2 is inserted between the upper and lower machining solution injection nozzles 18 and 18a by a wire electrode automatic insertion device (not shown), the upper machining solution injection nozzle 18 is returned to a predetermined height position by means of the Z shaft control, and the machining of the work 9 having an arbitrary shape can be resumed by means of the X shaft and Y shaft control.

In the second embodiment shown in FIG. 8, the machining solution injection nozzle 18 and the core 12a of the electromagnet 12 are made of an iron material having a high magnetic permeability or a stainless material for rust prevention, or they may be made of an iron material on the surface of which a anti-rust coating is then plated. Also, the permanent magnet 3 is formed of a ferrite or a rare earth magnetic material.

FIG. 9 is a schematic diagram showing a structural view partly in section of a third embodiment of a wire cut electric discharge machining apparatus according to the invention. The wire cut electric discharge machining apparatus shown in FIG. 9 is structurally different from that shown in FIG. 8 in that the electromagnet 12 and the permanent magnet 13 are arranged in parallel within the machining solution injection nozzle 18 and that the magnetic fluxes of the electromagnet 12 and permanent magnet 3 flow in parallel to each other. However, even in such structure in which the electromagnet 12 and permanent magnet 3 are arranged in parallel to each other, whether the magnetic flux of the electromagnet 12 and the magnetic flux of the permanent magnet 13 cancel each other or are put together can be controlled electrically and properly by controlling the direction and intensity of the electric current flowing through the coil 12b of the electromagnet 12.

Figure 10:
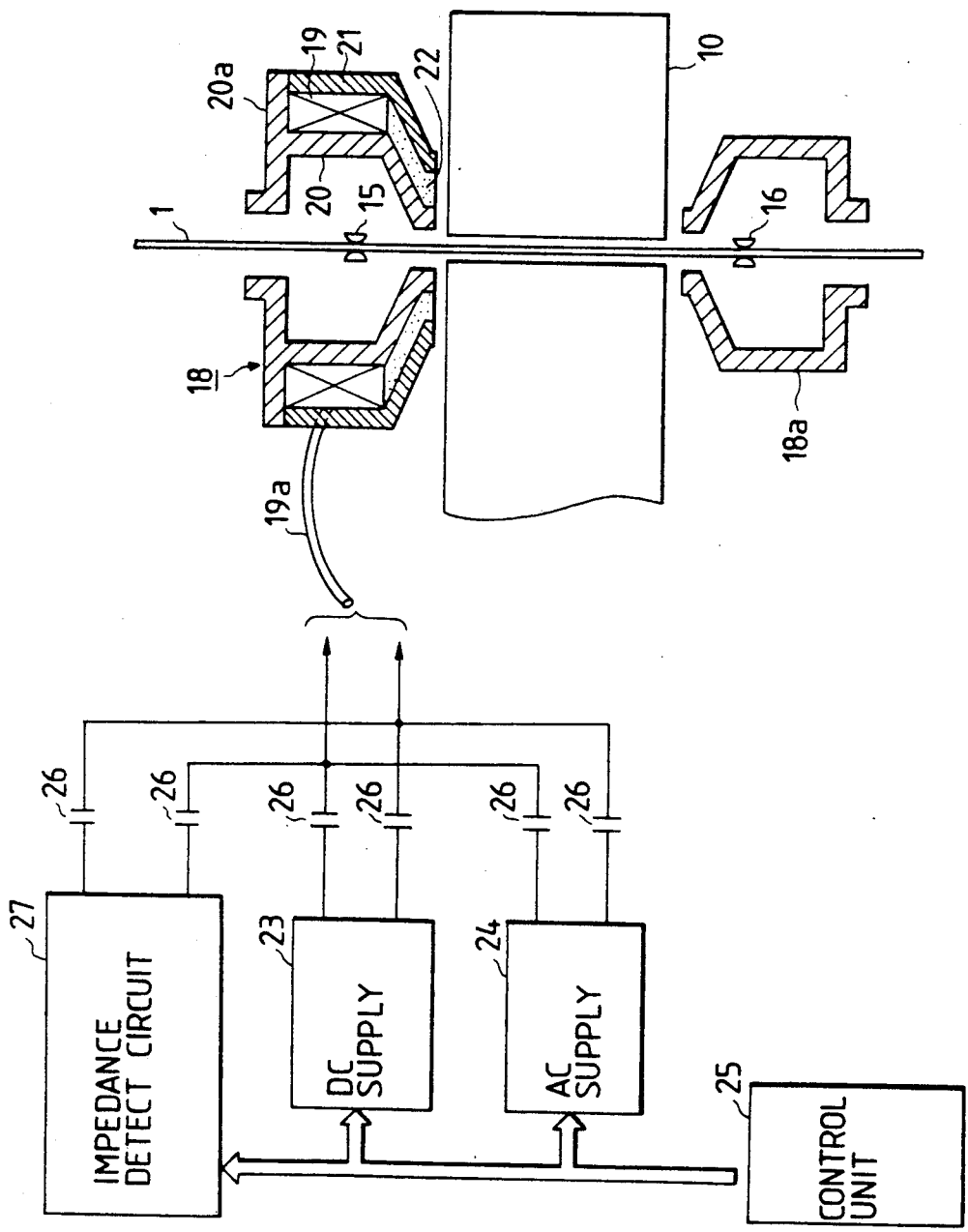
FIG. 10 is a schematic diagram showing a structural view partly in section of a fourth embodiment of a wire cut electric discharge machining apparatus according to the invention.

FIG. 10 is a schematic diagram showing a structural view partly in section of a fourth embodiment of the present invention. The fourth embodiment is a modification of the first embodiment of FIG. 5, which is obtained by providing the first embodiment with an impedance detection circuit for detecting the attraction condition of the work or work scrap with regard to the nozzle or the collision condition of the work or work scrap with regard to a part of the apparatus. Due to the provision of such an impedance detection circuit, it is possible to improve the accuracy in conveying or transportation.

In FIG. 10, reference numeral 27 denotes the impedance detection circuit for detecting variations of an impedance of the electromagnetic coil 19 and the remaining elements are same as those in the first embodiment of FIG. 5. The operation thereof is also substantially same as that of the first embodiment except the operation in connection with the operation of the impedance detecting circuit 27.

After excitation of the electromagnetic coil 19, the control circuit 25 operates to the impedance detection circuit to detect the attraction condition of the work 9 or work scrap based on variation of the impedance thereof. If the complete attraction condition is confirmed, the nozzle 18 is moved upwardly to lift the work 9 or work scrap. The following operation is substantially same as that of the other embodiments.

On the other hand, if if is confirmed by the impedance detection circuit 27 that the work 9 or work scrap is not sufficiently attracted to be lifted or moved by the machining solution injection nozzle 18, the control circuit 25 operates the DC power supply 23 again to carry out a retrying operation, that is, retry to attract the work 9 or work scrap again or repeatedly. Also, in the case where the complete attraction condition cannot be realized after several trials, the control circuit 25 operates to produce an alarm visually and/or audibly to stop the execution of a machining program.

Concrete example of the impedance detection circuit 27 will be described with reference to FIGS. 11 and 12 which are circuit diagrams showing a bridge circuit and an oscillation circuit acting as the impedance detection circuit, respectively.

Figure 11:
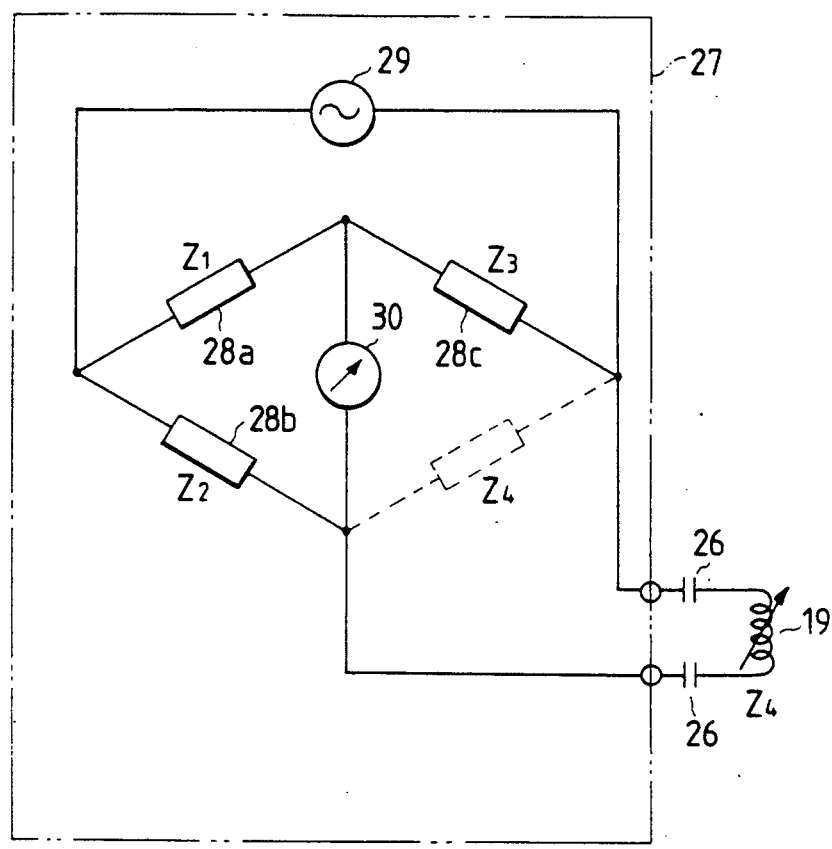
FIGS. 11 and 12 are circuit diagrams showing examples of an impedance detecting circuit for use in the wire cut electric discharge machining apparatus as shown in FIG. 10, respectively.

In FIG. 11 which shows a bridge circuit, reference numerals 28a to 28c designate impedance elements having impedances $Z_1$, $Z_2$ and $Z_3$, respectively; 29, an AC power source; and 30, an electric current detector. The electromagnetic coil 19 has an impedance of $Z_4$. These circuit elements constitute the bride circuit.

The bridge circuit is adjusted in such a manner that no electric current flows through the electric current detector 30 when nothing is attracted by the nozzle 18. If the work 9 or work scrap is attracted by the nozzle 18, the impedance $Z_4$ is caused to vary to destroy the equilibrium of the bridge circuit, so that the electric current is now allowed to flow through the electric current detector 30. Consequently, the attraction by the nozzle 18 can be positively detected.

Figure 12:
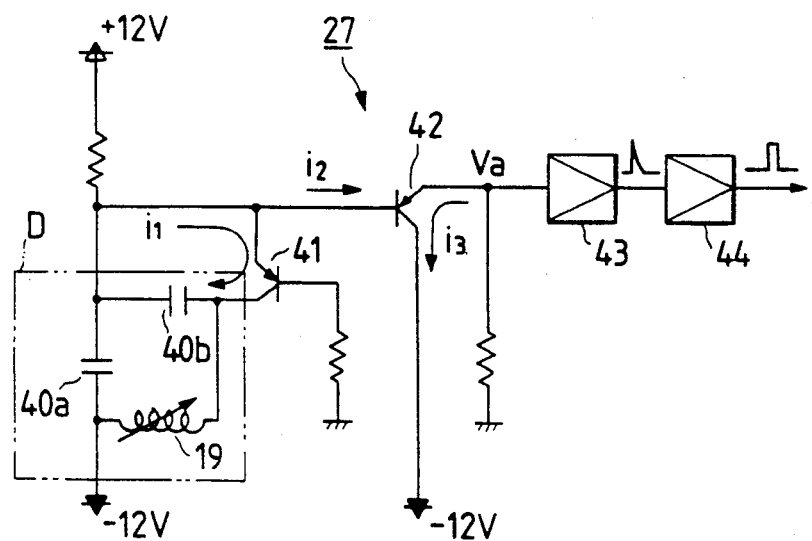

FIG. 12 is a circuit diagram showing another example of the impedance detection circuit, which is an oscillation circuit. In FIG. 12, reference numerals 40a and 40b designate capacitors, respectively; 41 and 42, transistors; 43, a differentiation circuit and 44, a waveform shaping circuit. In the impedance detection circuit 27 shown in FIG. 12, a parallel resonance circuit is constituted by the electromagnetic coil 19 and the two capacitors 40a and 40b, and if an electric current $i_1$ is supplied through the transistor 41, a circuit D indicated by a dotted line is made in a steady oscillation state. When the work 9 or work scrap is attracted by the nozzle 18, the impedance $Z_4$ of the electromagnetic coil 19 varies to cause the current $i_1$ to change. In response to this change of the current, the base current $i_2$ of the transistor 42 changes and also a collector current $i_3$ and a voltage Va change. The differentiation circuit 43 operates to output a trigger signal responsive to the change of the voltage Va, the output trigger signal is then converted into a pulse signal in the waveform shaping circuit 44. The pulse signal serving as a detection signal is output to the control circuit 25 shown in FIG. 10.

In the above-mentioned embodiments, the description has been given of the detection operation of the attraction condition. However, there is no intention to limit the function thereto but it is also possible to detect a collision between the nozzle and the workpiece 10 or the work 9 and the workpiece 10, or between the nozzle and mechanical structures in the moving operation of the nozzle, for example, while the nozzle is moving down in the Z shaft direction.

Figure 13:
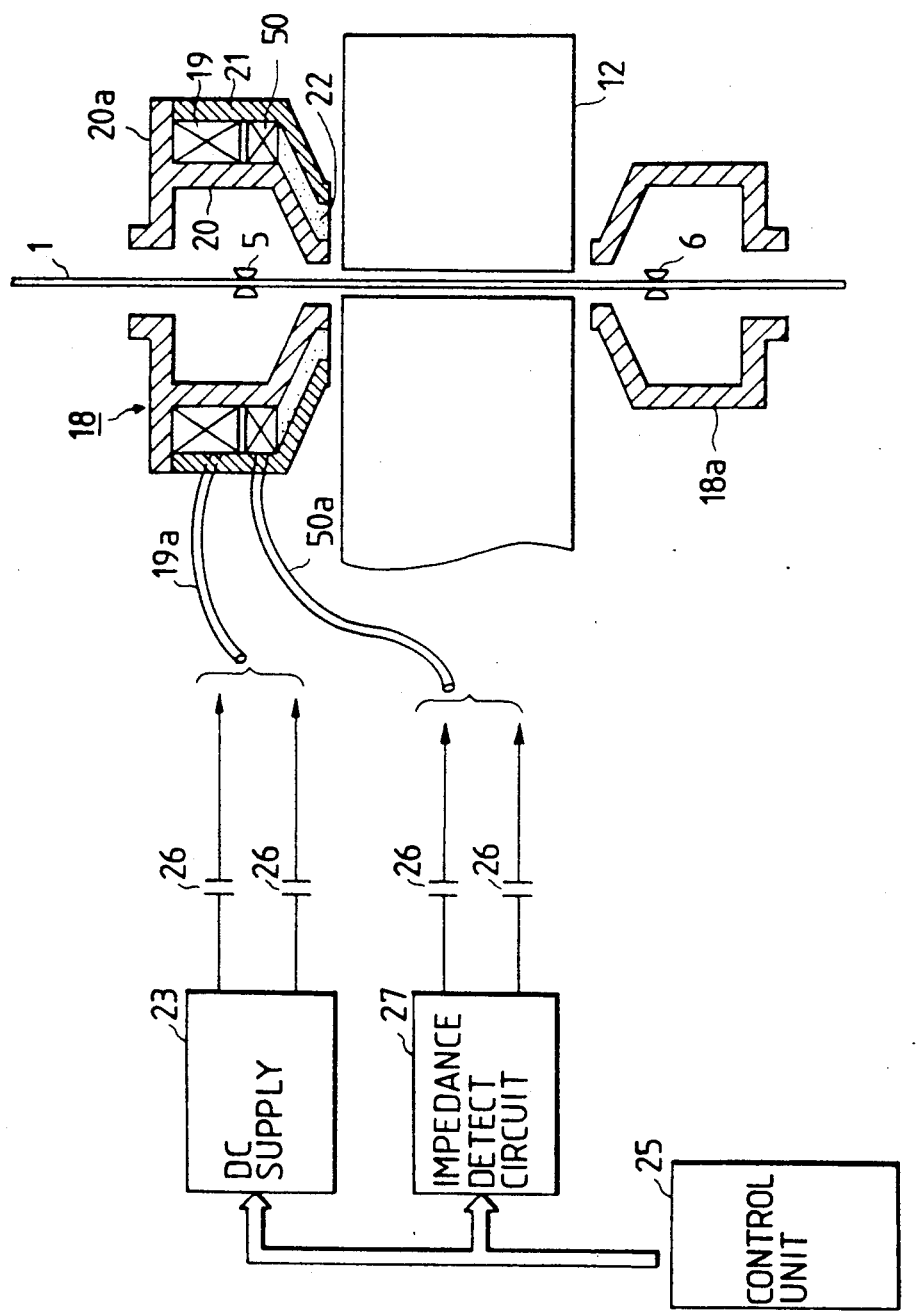
FIG. 13 is a schematic diagram showing a structural view partly in section of a fifth embodiment of a wire cut electric discharge machining apparatus according to the invention.

FIG. 13 is a schematic diagram showing a structural view partly in section of a fifth embodiment of the present invention. The fifth embodiment is a modification of the fourth embodiment of FIG. 10, which is obtained by providing the first embodiment with a detection coil 50 which is incorporated together with the electromagnetic coil 19 into the machining solution injection nozzle 18 made of a magnetic material having a dual structure and also includes a lead wire 50a extending externally. As is clear from FIG. 13, no AC power source is provided.

In the fourth embodiment of FIG. 10, the variation of the impedance of the electromagnetic coil 19 is directly detected by the impedance detection circuit 27. In the fifth embodiment, however, the impedance of the detection coil 50 is observed to achieve the same function as that of the fourth embodiment.

Figure 14:
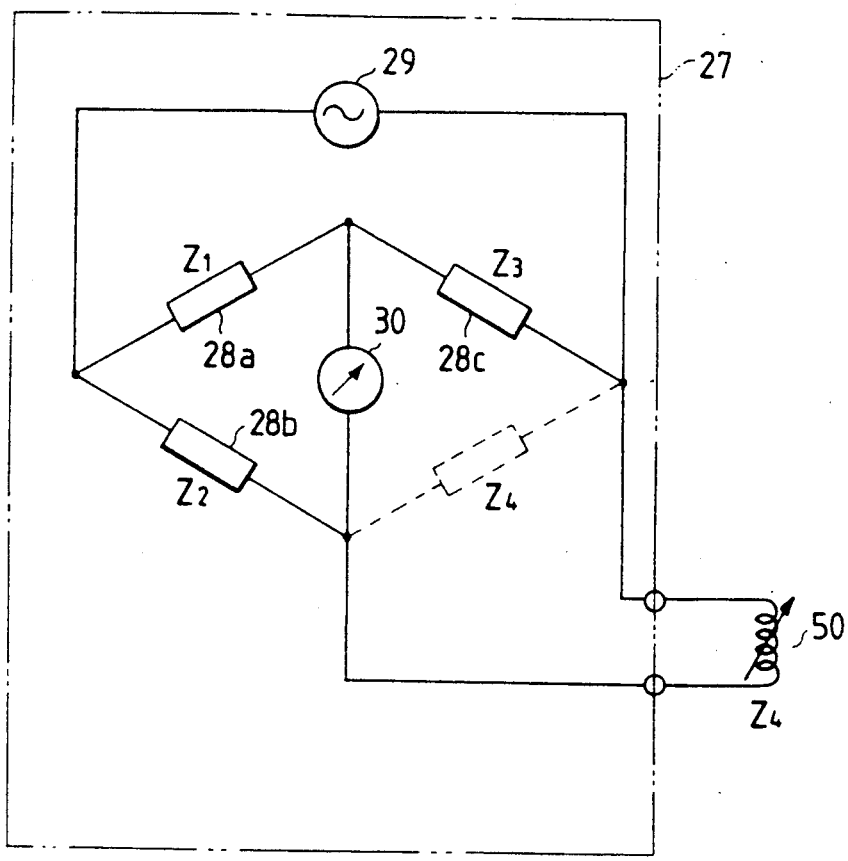
FIGS. 14 and 15 are circuit diagrams showing examples of an impedance detecting circuit for use in the wire cut electric discharge machining apparatus as shown in FIG. 13.
Figure 15:
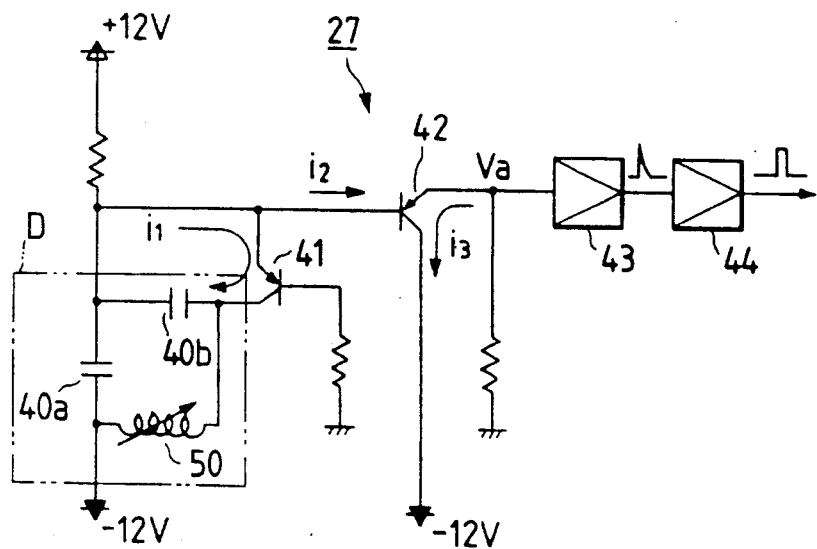

FIGS. 14 and 15 are circuit diagrams showing two examples of the impedance detection circuit 27 for use in the fifth embodiment of FIG. 13; which are a bridge circuit and an oscillation circuit, respectively. The examples of FIGS. 14 and 15 are substantially same as those of FIGS. 11 and 12 other than the detection coil 50.

Figure 16:
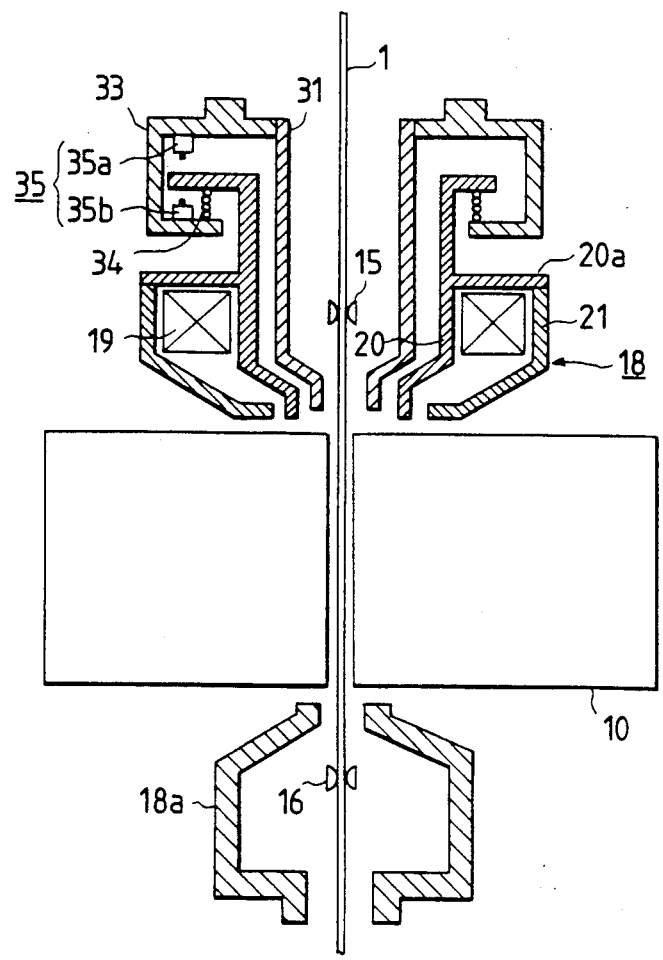
FIG. 16 is a schematic diagram showing a structural view partly in section of a sixth embodiment of a wire cut electric discharge machining apparatus according to the invention.

FIG. 16 is a schematic diagram showing a structural view partly in section of a sixth embodiment of the present invention in which the same reference numerals in FIG. 1 designate the same or similar parts of the wire cut electric discharge machining apparatus. In FIG. 16, reference numeral 31 designates a machining solution nozzle 31 made of a non-magnetic material, which is disposed coaxially with a magnet nozzle 18 corresponding to the nozzle 18 of FIG. 10. There is provided a detection device 35 between the machining solution nozzle 31 and the magnet nozzle 18, the detection device 35 being composed of detect switches 35a and 35b. The magnet nozzle 18 is movable by the order of several mm in a vertical direction because it is supported by a support spring 34 to a mount base 33. Further, the magnetic nozzle 18 is constituted, as shown in FIG. 10, by a cylindrically-shaped inside yoke 20 having a flange 20a and forming an inside ring-shaped magnetic circuit, a cylindrically-shaped output yoke 21 disposed outside the inside yoke 20 with the upper end thereof in contact with the inner surface of the flange 20a of the inside yoke 20. The inside yoke 20 and outside yoke 21 form an annular gap and also form a part of a magnetic circuit. The electromagnetic coil 19 is integrally incorporated in the annular gap between the inside and outside yokes 20 and 21, and the coil 19 is provided with a lead wire 19a extending externally.

Figure 17A:
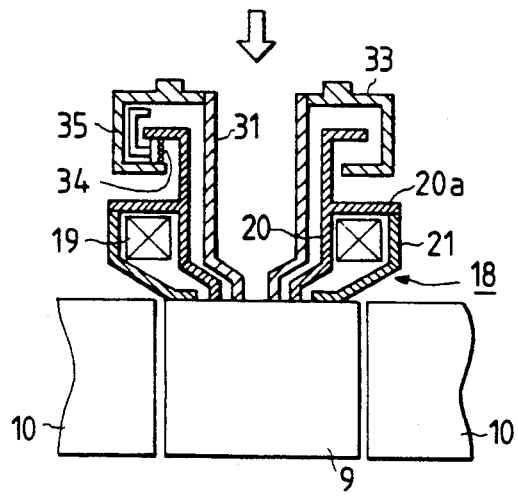
FIGS. 17(a) and (b) are explanatory diagrams for the description about the operation of the wire cut electric discharge machining apparatus as shown in FIG. 16.
Figure 17B:
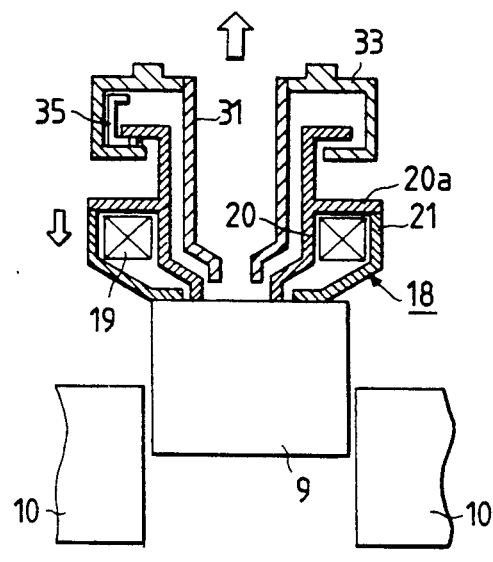

FIGS. 17a and 17b are explanatory diagrams showing the operation of the wire cut electric discharge machining apparatus of FIG. 16.

Now, the operation of the apparatus shown in FIG. 16 will be described with reference to FIGS. 17a and 17b.

As shown in FIG. 17a, if the electromagnetic oil 19 is excited after the machining of the work 9 has been completed, then a magnetic circuit is constituted by the inside yoke 20, the outside yoke 21 and the work 9, so that the work 9 can be attracted by the magnet nozzle 18. Thereafter, as shown in FIG. 8(b), if the mount base 33 is lifted in an upward direction as shown by an arrow, the magnet nozzle 18 rises later following the mount base 33. This is because the magnet nozzle 18 is supported by the support spring 34. Here, it should be noted that the support spring 34 has been adjusted in strength in such a manner that, when nothing is attracted by the magnet nozzle, no detection signal can be output at all from the detection device 35. When the work 9 is attracted by the magnet nozzle 18 and the work 9 will not drop even if it is taken out in an upward direction, then the work 17 is conveyed in a horizontal direction and is collected into a work collecting box (not shown) as is the same as the above described embodiments.

The foregoing description has been given of the normal operation of the present wire electrical discharge machine. In contrast, the following is the description about the abnormal operation thereof. For example, when the work 9 cannot be attracted by the magnet nozzle 18 enough to be lifted by the nozzle 18, then no detect signal is output and, therefore, the amount of the electric current for exciting the electromagnetic coil 19 is increased to thereby increase the electromagnetic force of the coil and then the operation of attracting the work 9 is retried. Also, when the work 9 cannot be collected into the work collecting box due to incomplete releasing operation, then the detect switch 35b of the detection device 35 is continuously turned on and the detection signals are thus continuously output. In this case, by changing the direction of the exciting current for the electromagnetic coil 19 for example, the apparatus automatically tries to release the work 9 from the magnet nozzle 18. Further, when the work 9 drops off from the magnet nozzle 18 while the work 9 is being transported to the work collection box, the conveying operation is stopped on the spot immediately and an abnormal signal is issued because the place where the work 9 is dropped cannot be found at that time.

Also, the detection device 35 is able to output a detection signal indicating the collision of the magnet nozzle 18 when such collision occurs, besides the detection signal that is output when the work 9 is attracted by the magnet nozzle 18. In particular, if the magnet nozzle 18 happens to contact the workpiece 10 or the like while it is lowering and then the magnet nozzle 18 is further going to lower, then the magnet nozzle 18 is pushed upwardly to thereby turn on the detect switch 35a of the detection device 35 so that the detection signal indicating the collision will be output. In this case, the magnet nozzle 18 may be prevented from lowering by the detection signal indicating the collision of the magnet nozzle 18.

As is apparent from the above, according to the present invention, at least one of the pair of upper and lower machining solution injection nozzles is made of a magnetic material having a high residual magnetic flux density, and an electromagnetic coil is integrally incorporated into the nozzle to construct the nozzle as an electromagnet. By magnetizing or demagnetizing the electromagnet, a part or all of a workpiece can be attracted and conveyed by the nozzle or can be released from the nozzle. Thanks to this structure, even when the electric current flowing through the electromagnet forming the nozzle is turned off after excitation of the electromagnet once, the magnetic force of the magnetic material can be maintained substantially unchanged to thereby eliminate the need to pass electric currents successively through the electromagnet. This can reduce generation of heat due to the electric currents to a minimum, so that it is possible to prevent deterioration of machining accuracy caused by such heat. Also, even when a electric power failure occurs during the operation of attracting or removing the work scrap accidently, the work or work scrap can be prevented from falling off but can be held due to the residual magnetic force, so that it is possible to prevent damage of the work, surface table and the like.

Further, according to the present invention, the wire cut electric discharge machining apparatus of the invention, at least one of a pair of upper and lower machining solution injection nozzles is made of a magnetic material, a permanent magnet is incorporated into the nozzle, and an electromagnet which is arranged so as to have a magnetic circuit in common with the permanent magnet is also incorporated integrally. The magnetic flux of the permanent magnet is controlled by controlling the direction of an electric current flowing through the coil of the electromagnet, so that a part or all of a workpiece can be attracted and lifted by the nozzle and the attracted work or workpiece can be released from the nozzle voluntarily. In other words, since this structure includes a mechanism which uses the permanent magnet and electromagnet in combination, no conventional movable mechanism is required. This results in making a machining solution injection nozzle simple in structure. Also, due to the fact that the attracting force generated by the magnetic force of the magnetic material forming the nozzle can be controlled electrically, such control can be achieved continuously and delicately according to the kinds, sizes, shapes and the like of the workpiece, and even when the electromagnet is not excited due to an electric power failure or the like, the magnetic force of the permanent magnet is effective in preventing the work and the work scrap from dropping or falling down off from the nozzle.

Furthermore, according to the present invention, there is provided an impedance detection circuit for detecting the variation in the impedance of an electromagnet or in the impedance of an inductance member provided to the nozzle to detect the attraction condition of the part or all of the workpiece or an occurrence of collision thereof against the part of apparatus. Thus, it becomes possible to prevent damage to the machine or workpiece and also possible to accomplish a reliable treatment of the workpiece and an automatic machining with high accuracy.

Moreover, according to the present invention, a pair of nozzles are constructed as a dual structure nozzle composed of a first nozzle made of a non-magnetic material for supplying a machine solution and a second nozzle coaxial with the first nozzle. The second nozzle is made of a magnetic material and is provided with an electromagnetic coil incorporated therein. The detection device is interposed between the first nozzle of non-magnetic material and the second nozzle of magnetic material, and the attraction or collision of a workpiece and a work scrap is detected in the nozzle portion of the machine, so that the detection device can be easily mounted into the dual structure nozzle consisting of the pair of nozzles and also a proper measure for emergencies can be taken easily in accordance with a detection signal from the detection device, that is, a completely automatic machining operation can be realized.

What is claimed is:

1. A wire cut electric discharge machining apparatus in which a workpiece is machined by an electric discharge which is generated in a machining gap between said workpiece and a wire-shaped electrode, the apparatus comprising:
   a pair of nozzles for supplying a machining solution to said machining gap;
   an electromagnetic coil provided to at least one of said pair of nozzles;
   a first power supply means for supplying a direct current (DC) to said electromagnetic coil to magnetize at least a part of said at least one nozzle to attract at least a part of said workpiece;
   a second power supply means for supplying alternating current (AC) to said electromagnetic coil so as to demagnetize said one nozzle and to release said part of said workpiece; and
   a control means for controlling the supply of both DC and AC power to said electromagnetic coil, wherein said AC power is attenuated gradually over a period of time so that said part of the workpiece can be delivered and released at a predetermined position from said one nozzle.

2. A wire cut electric discharge machining apparatus in which a workpiece is machined by an electric discharge which is generated in a machining gap between said workpiece and a wire-shaped electrode with a machining solution, the apparatus comprising:
   a pair of nozzles for supplying a machining solution to said machining gap;
   an electromagnetic coil which is integrally provided to at least one of said pair of nozzles;
   a power supply means for supplying power to said electromagnetic coil to magnetize at least a part of said at least one nozzle to attract at least a part of said workpiece, and
   a control means for controlling the supply of the power to said electromagnetic coil, wherein one of said nozzles is made of a magnetic material having a high residual magnetic flux density, and the part of said workpiece which is obtained by electric discharge machining is attracted to said nozzle by a residual magnetic force after the interruption of the power supply.

3. The apparatus as defined in claim 2 wherein said power supply means comprises means for supplying an AC power to said electromagnetic coil to demagnetize the magnetized part of said nozzle to release the part of said workpiece.

4. The apparatus as defined in claim 2 wherein said control means controls said power supply means to supply the DC power to said electromagnetic coil so as to produce a residual magnetic force sufficient to lift the part of said workpiece.

5. The apparatus as defined in claim 2 wherein said magnetic material is an alnico material.

6. A wire cut electric discharge machining apparatus in which a workpiece is machined by an electric discharge which is generated in a machining gap between said workpiece and a wire-shaped electrode with a machining solution, the apparatus comprising:
   a pair of nozzles for supplying a machining solution to said machining gap;
   an electromagnetic coil which is integrally provided to at least one of said pair of nozzles;
   a power supply means for supplying power to said electromagnetic coil to magnetize at least a part of said at least one nozzle to attract at least a part of said workpiece, and
   a control means for controlling the supply of the power to said electromagnetic coil, wherein one of said nozzles is made of a magnetic material and is provided with a permanent magnet in such a manner that said permanent magnet is arranged so as to have a magnetic circuit in common with said electromagnetic coil, and wherein said control means is operable to control said power supply means to change the flowing direction of a current so as to cancel the magnetic flux of said permanent magnet.

7. The apparatus as defined in claim 6 wherein said control means changes the flowing direction of the DC current to cancel the magnetic flux of said permanent magnet so that the part of said workpiece is released from the magnetized portion of said nozzle.

8. The apparatus as defined in claim 6 wherein said permanent magnet is arranged in series with said electromagnetic coil.

9. The apparatus as defined in claim 6 wherein said permanent magnet is arranged in parallel with said electromagnetic coil.

10. The apparatus as defined in claim 6 wherein said magnetic material is an iron material having a high magnetic permeability.

11. The apparatus as defined in claim 6 wherein said magnetic material is a stainless steel.

12. A wire cut electric discharge machining apparatus in which a workpiece is machined by an electric discharge which is generated in a machining gap between said workpiece and a wire-shaped electrode with a machining solution, the apparatus comprising:
   a pair of nozzles for supplying a machining solution to said machining gap;
   an electromagnetic coil which is integrally provided to at least one of said pair of nozzles;
   a power supply means for supplying power to said electromagnetic coil to magnetize at least a part of said at least one nozzle to attract at least a part of said workpiece, and
   a control means for controlling the supply of the power to said electromagnetic coil, wherein one of said nozzles is made of a magnetic material, and further comprising an impedance detecting means for detecting variation in the impedance of said electromagnetic coil.

13. The apparatus as defined in claim 12 wherein said impedance detecting means comprises a bridge circuit connected to said electromagnetic coil.

14. The apparatus as defined in claim 12 wherein said impedance detecting means comprises an oscillation circuit.

15. A wire cut electric discharge machining apparatus in which a workpiece is machined by an electric discharge which is generated in a machining gap between said workpiece and a wire-shaped electrode with a machining solution, the apparatus comprising:
   a pair of nozzles for supplying a machining solution to said machining gap;
   an electromagnetic coil which is integrally provided to at least one of said pair of nozzles;
   a power supply means for supplying power to said electromagnetic coil to magnetize at least a part of said at least one nozzle to attract at least a part of said workpiece, and a control means for controlling the supply of the power to said electromagnetic coil, wherein one of said nozzles is made of a magnetic material, and further comprising an impedance detecting means for detecting variation in the impedance of an impedance means which is provided to said magnetic nozzle.

16. The apparatus as defined in claim 15 wherein said impedance detecting means comprises a bridge circuit connected to said electromagnetic coil.

17. The apparatus as defined in claim 15 wherein said impedance detecting means comprises an oscillation circuit.

18. A wire cut electric discharge machining apparatus in which a workpiece is machined by an electric discharge which is generated in a machining gap between said workpiece and a wire-shaped electrode with a machining solution, the apparatus comprising:
 a pair of nozzles for supplying a machining solution to said machining gap;
 an electromagnetic coil which is integrally provided to at least one of said pair of nozzles;
 a power supply means for supplying power to said electromagnetic coil to magnetize at least a part of said at least one nozzle to attract at least a part of said workpiece, and
 a control means for controlling the supply of the power to said electromagnetic coil, wherein one of said nozzles is of the type which comprises a first nozzle member made of a non-magnetic material for supplying the machining solution;
 a second nozzle member made of a magnetic material, said second nozzle member being integrally provided with said electromagnetic coil;
 and means for detecting movement of said second nozzle member relative to said first nozzle member.

19. The apparatus as defined in claim 18 wherein said detecting means comprises an elastic member which maintains said second nozzle member in a neutral position when the part of said workpiece is electromagnetically attracted to said nozzle.

* * * * *